(12) United States Patent
Nammi et al.

(10) Patent No.: US 11,671,958 B2
(45) Date of Patent: *Jun. 6, 2023

(54) MANAGEMENT OF GROUP COMMON DOWNLINK CONTROL CHANNELS IN A WIRELESS COMMUNICATIONS SYSTEM

(71) Applicant: AT&T Intellectual Property I, L.P., Atlanta, GA (US)

(72) Inventors: SaiRamesh Nammi, Austin, TX (US); Arunabha Ghosh, Austin, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/199,327

(22) Filed: Mar. 11, 2021

(65) Prior Publication Data

US 2021/0204304 A1  Jul. 1, 2021

Related U.S. Application Data

(63) Continuation of application No. 15/587,233, filed on May 4, 2017, now Pat. No. 10,986,647.

(51) Int. Cl.
*H04W 72/12* (2023.01)
*H04W 72/121* (2023.01)
*H04W 84/04* (2009.01)

(52) U.S. Cl.
CPC ........ *H04W 72/121* (2013.01); *H04W 84/042* (2013.01)

(58) Field of Classification Search
CPC ............. H04W 72/042; H04W 72/121; H04W 84/042

See application file for complete search history.

(56) References Cited

U.S. PATENT DOCUMENTS 5,862,487 A 1/1999 Fujii et al.
8,238,475 B2 8/2012 Malladi et al.
(Continued)

FOREIGN PATENT DOCUMENTS

WO 2013/017154 A1 2/2013

OTHER PUBLICATIONS

Wu et al. "A new downlink control channel scheme for LTE", Vehicular Technology Conference (VTC Spring), 2013, https:/lwww.researchgate.net/publication/262179465_06691830. Retrieved on May 8, 2017, 7 pages.

(Continued)

*Primary Examiner* — Wayne H Cai
(74) *Attorney, Agent, or Firm* — Amin, Turocy & Watson, LLP

(57) ABSTRACT

Facilitating management of group common downlink control channels in a wireless communications system is provided herein. A method can comprise allocating, by a network device of a wireless network and comprising a processor, a group identifier to a mobile device based on a determination that the mobile device decodes a group common physical downlink control channel for wireless communications. The method can also comprise facilitating, by the network device, a transmission of data via the group common physical downlink control channel to the mobile device based on the group identifier.

20 Claims, 10 Drawing Sheets

(56) References Cited

U.S. PATENT DOCUMENTS

| | | |
|---|---|---|
| 8,374,109 B2 | 2/2013 | Luo et al. |
| 8,681,906 B2 | 3/2014 | Malladi et al. |
| 8,797,922 B2 | 8/2014 | Chen et al. |
| 8,811,207 B2 | 8/2014 | Iraji et al. |
| 8,830,928 B2 | 9/2014 | Iwamura et al. |
| 8,848,840 B2 | 9/2014 | Kwon et al. |
| 8,937,913 B2 | 1/2015 | Kim et al. |
| 8,995,363 B2 | 3/2015 | Suzuki et al. |
| 9,160,484 B2 | 10/2015 | Malladi et al. |
| 9,215,705 B2 | 12/2015 | Seo et al. |
| 9,288,756 B2 | 3/2016 | Stojanovski et al. |
| 9,319,963 B2 | 4/2016 | Lunden et al. |
| 9,438,399 B2 | 9/2016 | Kim et al. |
| 9,503,224 B2 | 11/2016 | Kim et al. |
| 9,591,642 B2 | 3/2017 | Wang |
| 9,591,653 B2 | 3/2017 | He et al. |
| 9,872,123 B2 | 1/2018 | Webb et al. |
| 10,028,210 B1 | 7/2018 | Nammi et al. |
| 10,382,169 B2 | 8/2019 | Cao et al. |
| 2010/0260089 A1 | 10/2010 | Lin et al. |
| 2011/0103509 A1 | 5/2011 | Chen et al. |
| 2011/0194511 A1 | 8/2011 | Chen et al. |
| 2012/0252447 A1 | 1/2012 | Sartori et al. |
| 2012/0076085 A1 | 3/2012 | Chou |
| 2012/0188961 A1 | 7/2012 | Suzuki et al. |
| 2012/0269140 A1 | 10/2012 | Nam et al. |
| 2012/0294213 A1 | 11/2012 | Chen et al. |
| 2012/0309441 A1 | 12/2012 | Eriksson et al. |
| 2013/0121267 A1 | 5/2013 | Koorapaty et al. |
| 2013/0121274 A1 | 5/2013 | Chen et al. |
| 2013/0128832 A1 | 5/2013 | Kang et al. |
| 2013/0223353 A1 | 8/2013 | Liu et al. |
| 2013/0250906 A1 | 9/2013 | Golitschek Edler Von Elbwart et al. |
| 2014/0010172 A1 | 1/2014 | Wei et al. |
| 2014/0029584 A1 | 1/2014 | Qu et al. |
| 2014/0050133 A1 | 2/2014 | Jafarian et al. |
| 2014/0169324 A1 | 6/2014 | Seo et al. |
| 2014/0179320 A1 | 6/2014 | Jang et al. |
| 2014/0185534 A1 | 7/2014 | Vos et al. |
| 2014/0255493 A1 | 9/2014 | Vanden Berghe |
| 2014/0301238 A1 | 10/2014 | Chun et al. |
| 2014/0334389 A1 | 11/2014 | Abdel-Samad et al. |
| 2015/0011215 A1 | 1/2015 | Uemura et al. |
| 2015/0230211 A1 | 8/2015 | You et al. |
| 2015/0245350 A1 | 8/2015 | Webb et al. |
| 2015/0282208 A1 | 10/2015 | Yi et al. |
| 2015/0327239 A1 | 11/2015 | Webb et al. |
| 2015/0341918 A1 | 11/2015 | Yang et al. |
| 2016/0088597 A1 | 3/2016 | Saito et al. |
| 2016/0165602 A1 | 6/2016 | Suda |
| 2016/0227573 A1 | 8/2016 | Quan et al. |
| 2016/0295560 A1 | 10/2016 | Chen et al. |
| 2016/0373901 A1 | 12/2016 | Urabayashi et al. |
| 2017/0048807 A1 | 2/2017 | Wang |
| 2017/0048829 A1 | 2/2017 | Kim et al. |
| 2017/0064671 A1 | 3/2017 | Rashid et al. |
| 2017/0111152 A1 | 4/2017 | Blankenship et al. |
| 2017/0171841 A1 | 6/2017 | Chen et al. |
| 2017/0171897 A1 | 6/2017 | Ryu et al. |
| 2017/0201964 A1 | 7/2017 | Gupta et al. |
| 2017/0251466 A1 | 8/2017 | Astely et al. |
| 2017/0265166 A1 | 9/2017 | Hosseini et al. |
| 2017/0339723 A1 | 11/2017 | Fujishiro et al. |
| 2017/0346544 A1 | 11/2017 | Islam et al. |
| 2017/0346545 A1 | 11/2017 | Islam et al. |
| 2018/0167959 A1 | 6/2018 | Liao et al. |
| 2018/0176810 A1 | 6/2018 | Thangarasa et al. |
| 2018/0279223 A1* | 9/2018 | Kim .................. H04L 5/0053 |
| 2018/0352416 A1 | 12/2018 | Ryu et al. |

OTHER PUBLICATIONS

Non Final office action received for U.S. Appl. No. 15/587,233 dated Jul. 24, 2018, 28 pages.

Final office action received for U.S. Appl. No. 15/587,233 dated Mar. 8, 2019, 25 pages.

Non Final office action received for U.S. Appl. No. 15/587,233 dated Aug. 22, 2019, 28 pages.

Final office action received for U.S. Appl. No. 15/587,233 dated Feb. 19, 2020, 37 pages.

Non Final office action received for U.S. Appl. No. 15/587,233 dated Jul. 9, 2020, 28 pages.

* cited by examiner

MANAGEMENT OF GROUP COMMON DOWNLINK CONTROL CHANNELS IN A WIRELESS COMMUNICATIONS SYSTEM

RELATED APPLICATION

The subject patent application is a continuation of, and claims priority to, U.S. patent application Ser. No. 15/587,233 (now U.S. Pat. No. 10,986,647), filed May 4, 2017, and entitled "MANAGEMENT OF GROUP COMMON DOWNLINK CONTROL CHANNELS IN A WIRELESS COMMUNICATIONS SYSTEM," the entirety of which application is hereby expressly incorporated by reference herein.

TECHNICAL FIELD

The subject disclosure relates generally to communications systems, and for example, to facilitating management of group common downlink control channels in a wireless communications system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
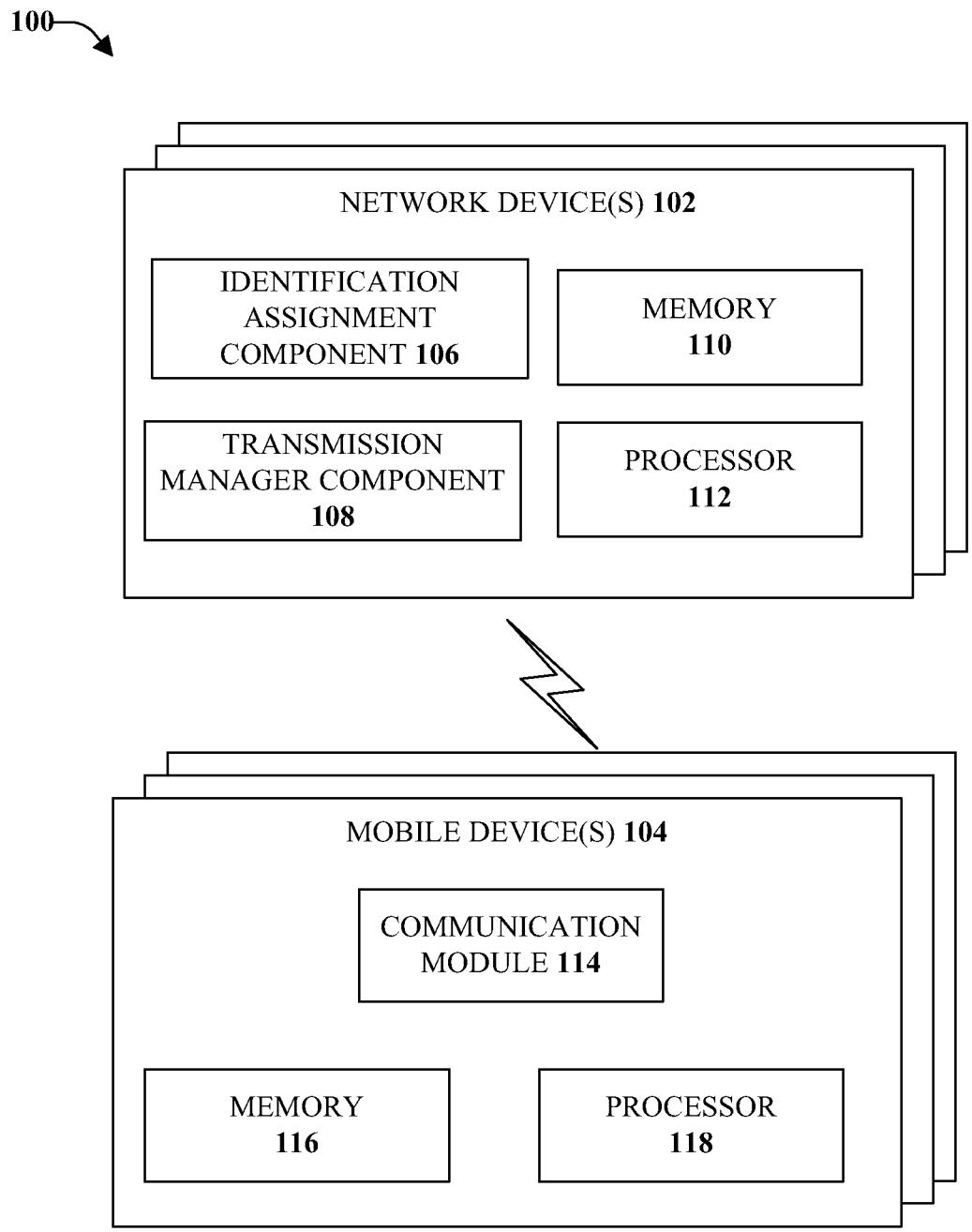
FIG. 1 illustrates an example, non-limiting communications system for providing management of group common downlink control channels in a wireless communications system.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that relate to management of group common downlink channels in a wireless communications network. For example, the various aspect relate to transmitting and receiving group common Physical Downlink Control Channels (PDCCH) in a wireless communications system.

According to some aspects, provided herein is a mechanism that can be utilized at a transmitter (e.g., a network device) to obtain information about a receiver (e.g., a mobile device) for decoding group PDCCH and PDCCH (e.g., whether the mobile device is decoding group common PDCCH for determining the control channel region or decoding PDCCH multiple times (blind decoding)). Based on this information, the mobile devices that use the group common PDCCH can be grouped for transmitting group PDCCH. According to an implementation, a network device can obtain information about whether a mobile device is decoding group common PDCCH or not. Based on the information, the network device can determine whether to transmit group common PDCCH for a particular mobile device. According to some implementations, the mobile device can communicate information to the network device about whether to transmit group common PDCCH or not transmit the group common PDCCH to the mobile device.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating management of group common downlink control channels for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In one embodiment, described herein is a method that can comprise allocating, by a network device of a wireless network and comprising a processor, a group identifier to a mobile device based on a determination that the mobile device is employing a group common physical downlink control channel for wireless communications. The method can also comprise facilitating, by the network device, a transmission of data via the group common physical downlink control channel to the mobile device based on the group identifier.

In an example, the method can comprise receiving, by the network device, an explicit indication from the mobile device. The explicit indication can comprise one data bit that indicates that the mobile device decodes the group common physical downlink control channel. Further to this example, receiving the explicit indication comprising the one data bit can comprise receiving a radio resource control message from the mobile device.

In another example, the method can comprise receiving, by the network device, an implicit indication from the mobile device. The implicit indication can comprise data related to a category of device to which the mobile device belongs. A first category can indicate the mobile device decodes the group common physical downlink control channel. A second category can indicate the mobile device does not decode the group common physical downlink control channel.

According to another example, the mobile device can be a first mobile device and the determination can be a first determination. The method can comprise allocating, by the network device, the group identifier to a second mobile device based on a second determination that the second mobile device decodes the group common physical downlink control channel for wireless communications. Facilitating the transmission can comprise facilitating the transmission of the data via the group common physical downlink control channel to the second mobile device based on the group identifier.

In accordance with another example, the mobile device can be a first mobile device and the determination can be a first determination. The method can comprise determining, by the network device, that a second mobile device does not decode the group common physical downlink control channel. The method can also comprise facilitating, by the network device, a second transmission to the second mobile device. The second transmission can comprise an indication that the group common physical downlink control channel is not intended for the second mobile device.

In another example, the method can comprise autonomously determining, by the network device, that the mobile device decodes the group common physical downlink control channel. Further to this example, the method can comprise sending, by the network device, a request for the mobile device to provide a report to the network device. The method can also comprise determining, by the network device, that the mobile device decodes the group common physical downlink control channel based on the report being determined not to have been received from the mobile device within a threshold number of requests for the report. In accordance with an aspect, the report can be an aperiodic channel status indication report. In accordance with another aspect, the report can be a sounding reference signal measurement.

In accordance with an embodiment, a device can comprise a processor and a memory that stores executable instructions that, when executed by the processor, facilitate performance of operations. The operations can comprise transmitting an indication that information contained in a group common physical downlink control channel is utilized by the device and receiving an assignment of a group identifier in response to the transmission. The operations can also comprise receiving the information in the group common physical downlink control channel indicated for the group identifier. The group identifier categorizes mobile devices in a wireless network, comprising the device, that employ the information contained in the group common physical downlink control channel for communication within the wireless network.

In an example, the operations can comprise transmitting the indication as an explicit indication, wherein the indication comprises a single data bit. In another example, the operations can comprise transmitting the indication implicitly, wherein the indication comprises a device category. A first indication of a first device category indicates the device uses the information contained in the group common physical downlink control channel A second indication of a second category indicates the mobile device does not use the information contained in the group common physical downlink control channel.

According to another embodiment, a system can comprise a processor and a memory that stores executable instructions that, when executed by the processor, facilitate performance of operations. The operations can comprise assigning a group identifier to a mobile device based on a determination that the mobile device employs data contained in a group common physical downlink control channel. The operations can also comprise transmitting the data via a group common physical downlink control channel to the group identifier. The group identifier can identify mobile devices in a wireless network, comprising the mobile device, that employ the information contained in the group common physical downlink control channel for communication within the wireless network.

According to an example, the operations can comprise receiving, from the mobile device, an indication that the group common physical downlink control channel is decodes by the mobile device. The indication can comprise a single data bit.

In an example, the operations further comprise receiving, from the mobile device, an indication that the group common physical downlink control channel is decoded by the mobile device. The indication can comprise a device category. A first indication of a first device category can indicate the mobile device decodes the group common physical downlink control channel A second indication of a second category can indicate the mobile device does not decode the group common physical downlink control channel.

In another example, the operations can comprise requesting a report from the mobile device. The operations can also comprise determining the mobile device decodes the group common physical downlink control channel as a result of the report not being received within a defined number of request attempts.

According to yet another embodiment, described herein is a machine-readable storage medium comprising executable instructions that, when executed by a processor, facilitate performance of operations. The operations can comprise assigning a first mobile device to a group identifier based on a first determination that the first mobile device decodes a group common physical downlink control channel for wireless communications. The operations can also comprise assigning a second mobile device to the group identifier based on a second determination that the second mobile device decodes the group common physical downlink control channel for wireless communications. Further, the operations can comprise facilitating transmitting data via the group common physical downlink control channel to the first mobile device and the second mobile device based on the group identifier.

In an example, the group identifier can identify a group mobile devices that decode the group common physical downlink control channel. The mobile devices can comprise the first mobile device and the second mobile device.

In another example, the operations can comprise facilitating transmitting, to a third mobile device, a notification that the group common physical downlink control channel is not intended for the third mobile device based on a third determination that the third mobile device does not decode the group common physical downlink control channel for wireless communications.

Referring initially to FIG. 1 illustrated is an example, non-limiting communications system 100 for providing management of group common downlink control channels in a wireless communications system. The various aspects provided herein can provide various technical solutions to technical problems. For example, the various aspects can provide increased capacity due to the reduced number of resources for group common PDCCH. In another example, the various aspects can provide improved power efficiency since the transmitter (e.g., the network device) can completely switch off the group common PDCCH transmission. In yet another example, the various aspects can provide, at the mobile device side, processor efficiency since there is no need to allocate resources for decoding group common PDCCH processing at a mobile device that does not use the PDCCH.

The non-limiting communications system 100 can comprise one or more network devices (illustrated as a network device 102) and one or more mobile devices (illustrated as a mobile device 104). The network device 102 can be included in a group of network devices of a wireless network. Although only a single mobile device and a single network device are illustrated, the non-limiting communications system 100 can comprise a multitude of mobile devices and/or a multitude of network devices.

The network device 102 can comprise an identification assignment component 106, a transmission manager component 108, at least one memory 110, and at least one processor 112. Further, the mobile device 104 can comprise a communications module 114, a memory 116, and a processor 118. The identification assignment component 106 can allocate a group identifier to the mobile device 104. The group identifier can be utilized to distinguish mobile devices that use (e.g., decode data contained in) a group common physical downlink control channel (PDCCH) for wireless communications from other mobile devices that do not use the PDCCH for wireless communications. According to some implementations, the group identifier can be a radio network temporary identifier (RNTI). An indication of the group identifier can be received by the mobile device 104 via the communications module 114.

The transmission manager component 108 can facilitate a transmission of the group common PDCCH to the mobile device 104 based on the group identifier. The transmission of the group common PDCCH can also be sent to other mobile devices that are allocated to the group identifier (e.g., other mobile devices that use the group common PDCCH). The transmission of the group common PDCCH is not sent to mobile devices that do not use the group common PDCCH. According to an implementation, the mobile devices not allocated to the group identifier can be transmitted an indication that the group common PDCCH is not intended for those mobile devices.

The group common PDCCH is a channel that provides flexibility for the network (e.g., the network device 102) to dynamically allocate resources. Further, the group common PDCCH can be utilized to reduce blind decoding attempts at the mobile device 104. In some instances (e.g., a 5G mobile device) can decode the PDCCH without the group common PDCCH by using multiple blind decodes. Thus, it might be difficult for the network device 102 to know when to transmit the group common PDCCH, or when the transmission is not needed. For example, if the network device 102 transmits the group common PDCCH by allocating resources and no mobile device in the network use that information, the resources allocated for group common PDCCH are not used efficiently. On the other hand, if the network device 102 switches off group common PDCCH, a mobile device that might be using group common PDCCH cannot determine the slot structure or other information and, therefore, might use blind decoding. However, the use of blind decoding can reduce the battery life of the mobile device. Therefore, the disclosed aspects provide for the management of a group common PDCCH at the transmitter (e.g., the network device 102) and receiver (e.g., the mobile device 104) to determine when to transmit and when to stop transmitting group common PDCCH.

The respective one or more memories 110, 116 can be operatively coupled to the respective one or more processors 112, 118. The respective one or more memories 110, 116 can store protocols associated with management of group common PDCCH as discussed herein. Further, the respective one or more memories 110, 116 can facilitate action to control communication between the network device 102 and the mobile device 104, such that the non-limiting communications system 100 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 112, 118 can facilitate respective analysis of information related to transmission of a group common PDCCH in a communication network. The processors 112, 118 can be processors dedicated to analyzing and/or generating information received, processors that control one or more components of the non-limiting communications system 100, and/or processors that both analyze and generate information received and control one or more components of the non-limiting communications system 100.

Further, the term network device (e.g., network node, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes (e.g., network device 102) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 2:
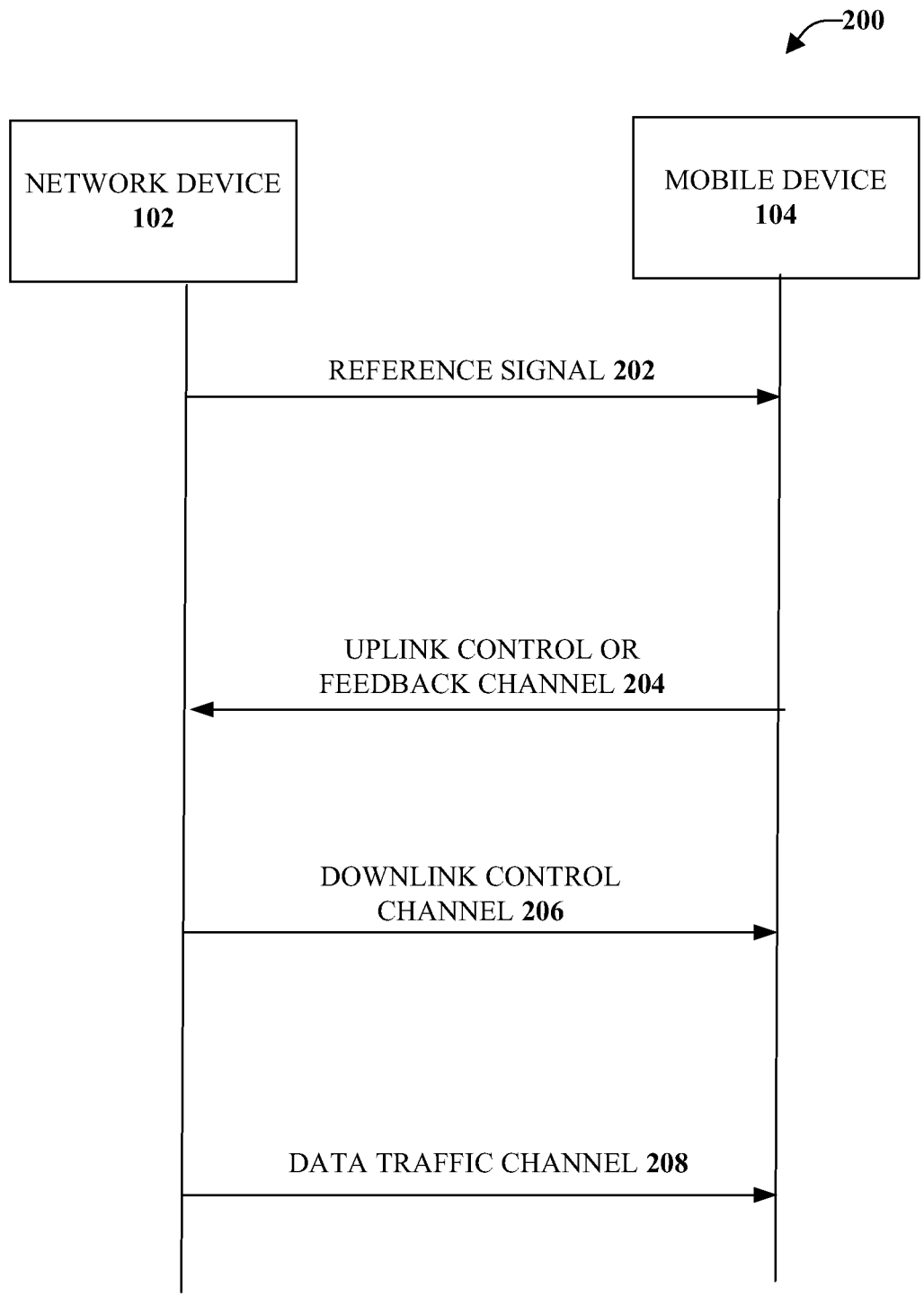
FIG. 2 illustrates an example, non-limiting message sequence flow chart that can facilitate downlink data transfer in accordance with one or more embodiments described herein.

To further explain the various aspects, FIG. 2 illustrates an example, non-limiting message sequence flow chart 200 that can facilitate downlink data transfer in accordance with one or more embodiments described herein. Repetitive description of like elements employed in other embodiments described herein is omitted for sake of brevity. The non-limiting message sequence flow chart 200 can be utilized for new radio, as discussed herein. As illustrated, the non-limiting message sequence flow chart 200 represents the message sequence between the network device 102 and the mobile device 104. As used herein, the term "network device 102" can be interchangeable with (or include) a network, a network controller or any number of other network components. One or more pilot signals and/or reference signals 202 can be transmitted from the network device 102 to the mobile device. The one or more pilot signals and/or reference signals 202 can be beamformed or non-beamformed. Based on the one or more pilot signals and/or reference signals 202, the mobile device 104 can compute the channel estimates and can determine the one or more parameters needed for channel state information (CSI) reporting. The CSI report can comprise, for example, channel quality indicator (CQI), precoding matrix index (PMI), rank information (RI), the best subband indices, best beam indices etc., or any number of other types of information.

The CSI report can be sent from the mobile device 104 to the network device 102 via a feedback channel (e.g., uplink control or feedback channel 204). The network device 102, which can comprise a scheduler 120, can use the CSI report for choosing the parameters for scheduling of the particular mobile device 104. The network device 102 can send the scheduling parameters to the mobile device 104 in a downlink control channel (e.g., downlink control channel 206). After the scheduling parameter information is transmitted, the actual data transfer can take place from the network device 102 to the mobile device 104 over the data traffic channel 208.

The downlink control channel carries information about the scheduling grants. This can include a number of MIMO layers scheduled, transport block sizes, modulation for each codeword, parameters related to Hybrid Automatic Repeat Request (HARQ), sub band locations, and precoding matrix index corresponding to the sub bands.

Various information can be transmitted by means of the downlink control information (DCI) format. Such information can include: localized/distributed Virtual Resource Block (VRB) assignment flag, resource block assignment, modulation and coding scheme, HARQ process number, new data indicator, redundancy version, Transmission Power Control (TPC) command for uplink control channel, downlink assignment index, precoding matrix index, number of layers, transmitter beam information for data channel, Quasi Co-Location (QCL) condition, and/or Demodulation Reference Signal (DMRS) port information.

Figure 3:
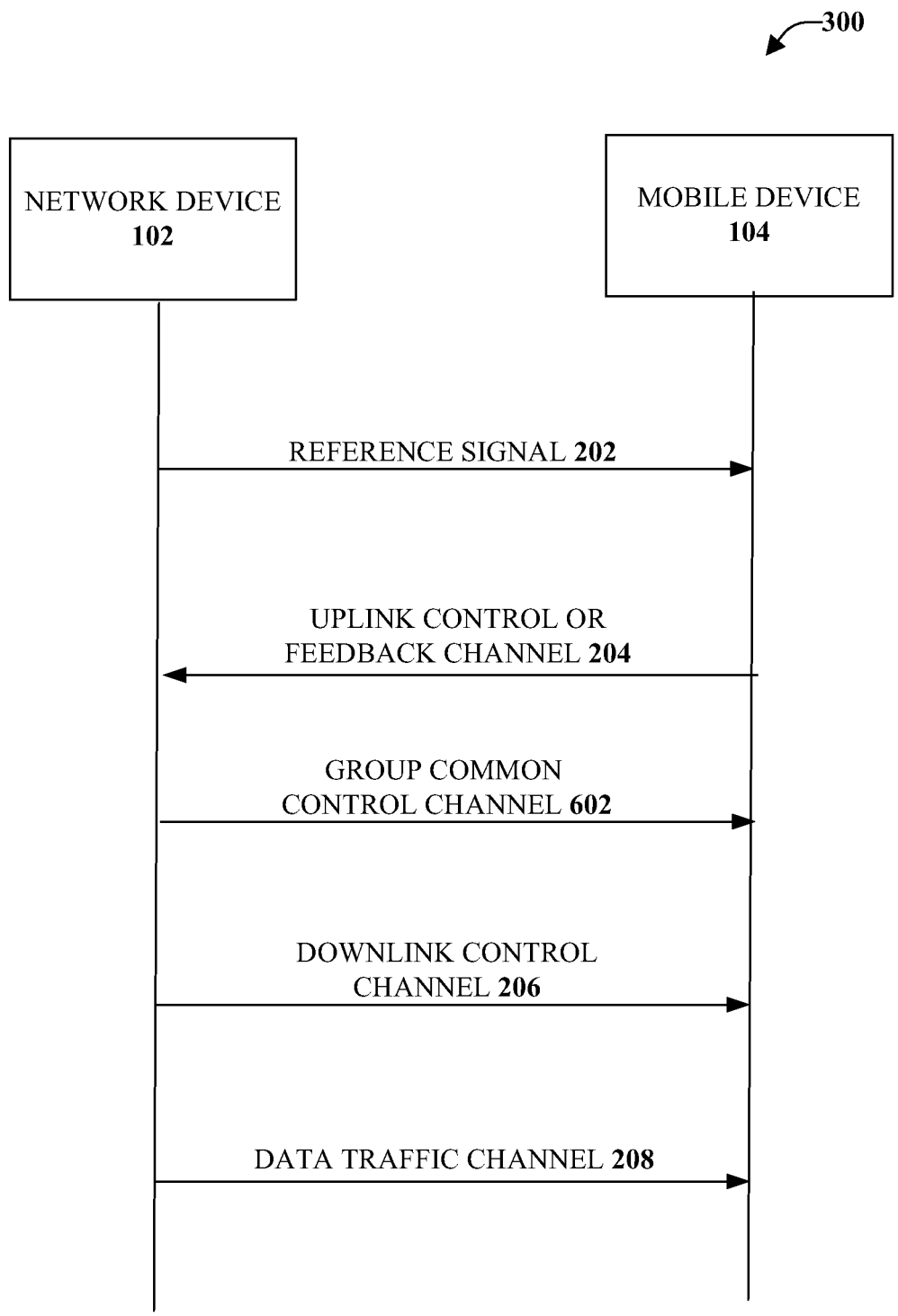
FIG. 3 illustrates an example, non-limiting message sequence flow chart that can facilitate configuring a mobile device with a group common control channel in accordance with one or more embodiments described herein.

FIG. 3 illustrates an example, non-limiting message sequence flow chart 300 that can facilitate configuring a mobile device with a group common control channel in accordance with one or more embodiments described herein. Repetitive description of like elements employed in other embodiments described herein is omitted for sake of brevity. The non-limiting message sequence flow chart 300 can be utilized for new radio, as discussed herein. As illustrated, the non-limiting message sequence flow chart 300 represents the message sequence between the network device 102 and the mobile device 104.

According to the implementation of FIG. 3, the network node (e.g., the network device 102) can indicate, using group common control channel 302, the parameters to be used by the mobile device 104 to decode the control channel. The non-limiting message sequence flow chart 300 of FIG. 3 can be similar to the higher layer signaling, as discussed above. However, in this implementation, the parameters can be sent using a separate signaling (e.g., the group common control channel 302), which can be changed dynamically. Further, the other parameters can be sent explicitly (e.g., index of the coreset), thereby minimizing the overhead of the group common control channel. As an example, the group common control channel carries information of slot structure and index 1 of the coreset, which can be predefined. The network (e.g., the network device 102) can be provided the opportunity to change the coreset dynamically in the next instance as the group common control channel can be transmitted every time before the DCI is transmitted as illustrated in FIG. 3.

The group common control channel is a channel that is common to a group of mobile device in the cell (e.g., wireless network) for assisting the mobile device in decoding the PDCCH. The group common control channel contains a few number of bits and generally carries information about the slot structure, whether the current slot is for downlink or for uplink transmission, where the mobile device should decode for PDCCH, and information about reference signal or its density for decoding PDCCH, modulation and/or code rate for PDCCH, channel encoding parameters for example if PDCCH uses polar code, the polar code parameters such as frozen bit set, and so on. It is noted that these parameters are either sent explicitly or implicitly means, these parameters can be defined, and one index can be sent as part of group common PDCCH. Illustrated in FIG. 3, the group common PDCCH channel is transmitted along with PDCCH to assist the mobile device in decoding the downlink control channel. The mobile device might decode the group common PDCCH before decoding PDCCH. Currently, 3GPP is studying various options for the contents of group common PDCCH and it is expected that the overhead of group common PDCCH is very low, typically 2-5 bits but might not be greater than 16 bits.

As mentioned previously, the group common PDCCH is a channel that provides flexibility for the network to dynamically allocate resources while reducing the blind decoding attempts at the mobile device. It is noted that a 5G mobile device can decode the PDCCH without group PDCCH by using multiple blind decodes. Hence the network does not know when to transmit the group common PDCCH. For example, if the network transmit the group common PDCCH by allocating resources and no mobile device in the network use that information, the resources allocated for group common PDCCH are not used efficiently. On the other hand if the network switches off group common PDCCH, then some mobile devices which might be using group common PDCCH will not be able to determine the slot structure and other information and, therefore, need to use blind decoding. This in turn reduces the battery life of the mobile device.

Figure 4:
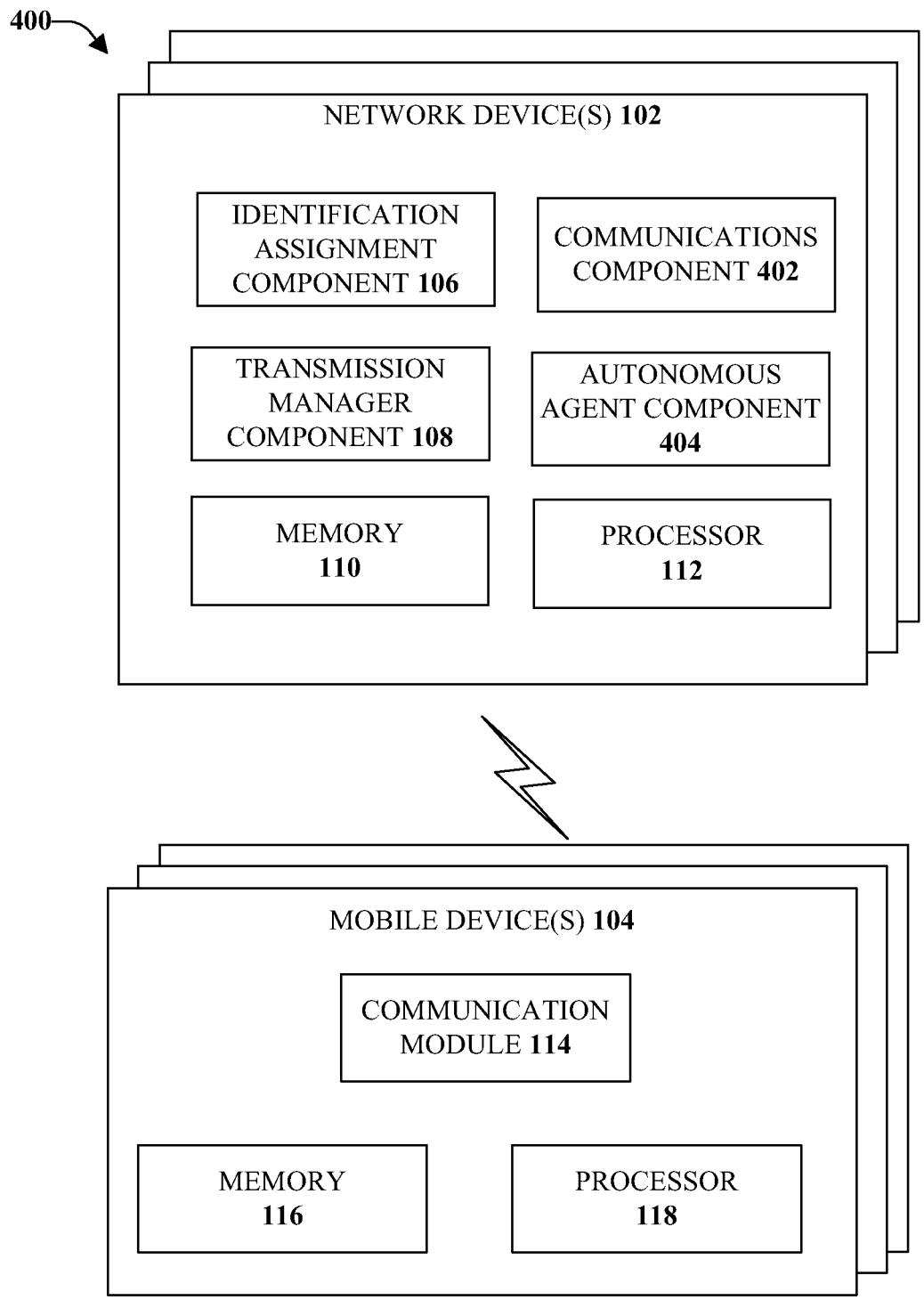
FIG. 4 illustrates an example, non-limiting communications system that obtains information to determine whether a group common physical downlink control channel should be transmitted to a mobile device in accordance with one or more embodiments described herein.

FIG. 4 illustrates an example, non-limiting communications system 400 that obtains information to determine whether a group common PDCCH should be transmitted to a mobile device in accordance with one or more embodiments described herein. Repetitive description of like elements employed in other embodiments described herein is omitted for sake of brevity. The non-limiting communications system 400 can comprise one or more of the components and/or functionality of non-limiting communications system 100 and vice versa.

In order to manage group common downlink control channels, the network device 102 should have information related to which devices are currently utilizing the group common downlink control channels (e.g., the group common PDCCH) and which devices are not using the channels. For example, the network device 102 should obtain information related to whether the mobile device is decoding group common PDCCH or is not decoding group common PDCCH. According to some implementations, the network device 102 can receive implicit information and/or implicit information from the mobile device. Alternatively, the network device 102 can autonomously determine whether a mobile device is using the channels.

In some implementations, the mobile device 104, through the communications module 114, can explicitly inform the network device 102 about use of the group common PDCCH at the mobile device 104. For example, the communications module 114 can send one data bit that indicates usage of the group common PDCCH at the mobile device 104. The network device 102 can comprise a communications component 402 that can receive the explicit indication from the mobile device 104. According to some implementations, the explicit indication can be received in a radio resource control (RRC) message.

According to some implementations, the mobile device 104, through the communications module 114 can implicitly inform the network device 102 about use of the group common PDCCH at the mobile device 104. For example, the implicit indication can comprise data related to a category of device to which the mobile device belongs. A first category can indicate the mobile device uses the group common PDCCH and a second category can indicate the mobile device does not use the group common PDCCH. The communications component 402 of the network device can receive the implicit indication.

As mentioned, the mobile device can indicate to the network if it uses group common PDCCH for decoding PDCCH/PDSCH (Physical Downlink Shared Channel). For example, if the mobile device is in low battery power mode, then the mobile device should use group common PDCCH instead of using multiple PDCCH decoding attempts in over to save battery life. In this case, the mobile device can indicate to the network that it requires group common PDCCH transmission. Similarly, if the mobile device is at a cell edge or has a low signal-to-interference-plus-noise ratio (SINR), then the mobile device should use group common PDCCH to conserve resources.

Alternatively, the network device can comprise an autonomous agent component 404 that can autonomously determine whether the mobile device 104 uses the group common PDCCH. For example, the communications component 402 can send a request for the mobile device 104 to provide a report to the network device 102. The report can be an aperiodic channel status indication report or a sounding reference signal measurement. In an example, the network device 102 can send multiple requests for the report. If the mobile device responds to the at least a threshold number of requests, it can indicate that the mobile device is capable of performing blind decoding and the autonomous agent component 404 can determine the group common PDCCH is not currently used by the mobile device. However, if the mobile device does not respond to at least the threshold number of requests, it can indicate the mobile device currently utilizes the group common PDCCH and, therefore, the autonomous agent component 404 can determine the device should receive the common group PDCCH. In this situation, the identification assignment component 106 assigns the mobile device to the group identifier and the transmission manager component 108 transmits the group common PDCCH to the mobile devices associated with the group identifier, including the mobile device 104. The transmission manager component 108 can transmit the channel utilizing radio resource control signaling. According to some implementations, the group common physical downlink control channel comprises a group common physical downlink control channel configured to operate according to a fifth generation wireless communication network protocol.

The communications component 402 and/or the communications module 114 can be a transmitter/receiver configured to transmit to and/or receive data from the network device 102, the mobile device 104, other network devices, and/or other mobile devices. Through the communications component 402, the network device 102 can concurrently transmit and receive data, can transmit and receive data at different times, or combinations thereof. In a similar manner, through the communications module 114, the mobile device 104 can concurrently transmit and receive data, can transmit and receive data at different times, or combinations thereof.

Figure 5:
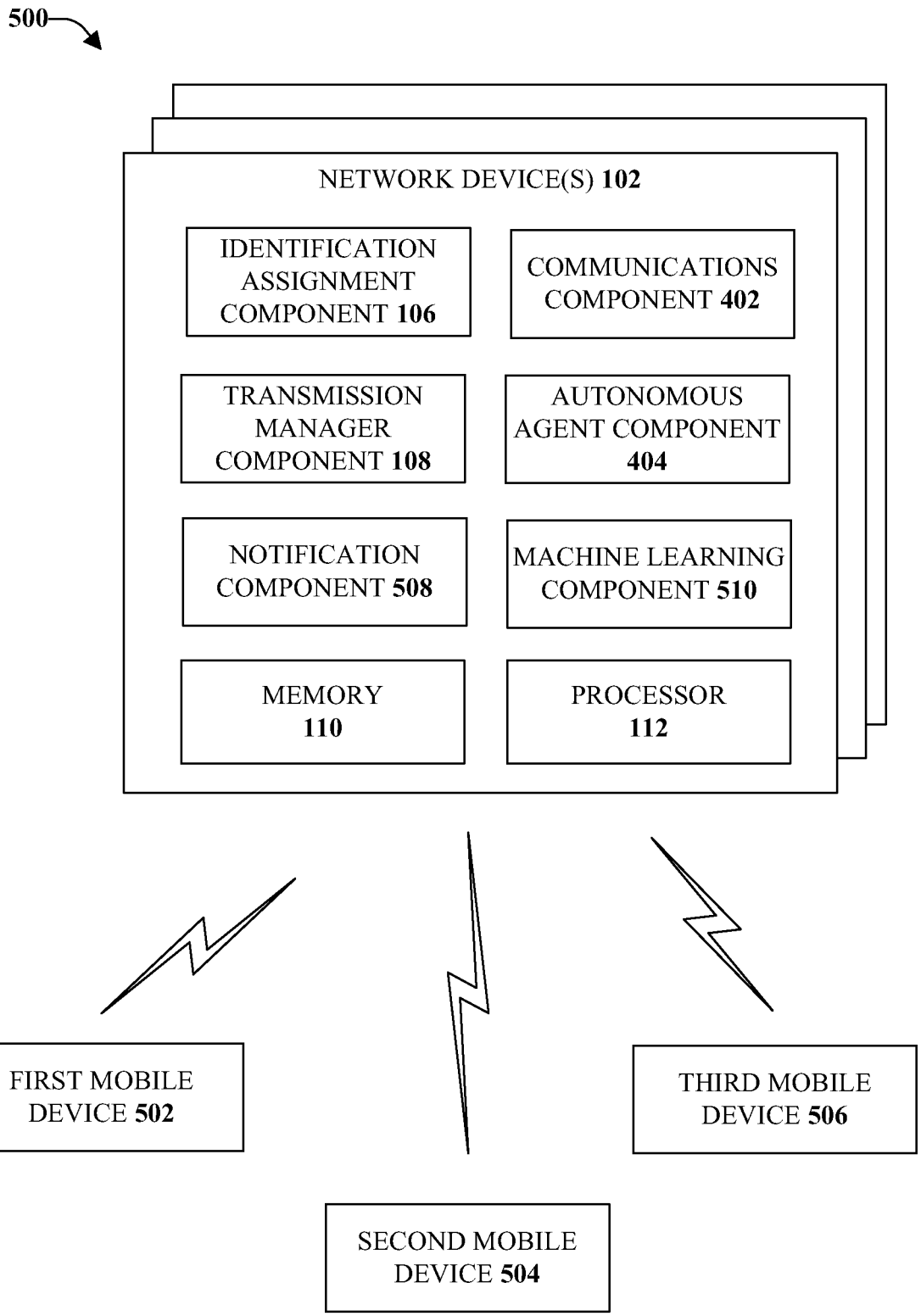
FIG. 5 illustrates an example, non-limiting communications system that selectively transmits a group common physical downlink control channel in a wireless network in accordance with one or more embodiments described herein.

FIG. 5 illustrates an example, non-limiting communications system 500 that selectively transmits a group common PDCCH in a wireless network in accordance with one or more embodiments described herein. Repetitive description of like elements employed in other embodiments described herein is omitted for sake of brevity. The non-limiting communications system 500 can comprise one or more of the components and/or functionality of non-limiting communications system 100, and/or non-limiting communications system 400, and vice versa.

Illustrated in FIG. 5 is a first mobile device 502, a second mobile device 504, and a third mobile device 506, which can be similar to and include the functionality of the mobile device 104 of FIG. 1 and/or the mobile device 104 of FIG. 4. A wireless network can include multiple mobile devices, only three of which are illustrated and described for purposes of simplicity.

According to some implementations, a first set of mobile devices in a wireless network could utilize the group common PDCCH and a second set of mobile devices in the wireless network might not utilize the group common PDCCH. Thus, the network device 102 can selectively transmit the group common PDCCH to the first set, and not transmit the channel to the second group. This can converse resources and increase processing efficiency at the mobile devices in the second set since monitoring and decoding of the group common PDCCH is not performed at the second set of devices in accordance with the various aspects provided herein.

In some implementations, it could be determined that a mobile device is not currently using the group common PDCCH and, thus, can be associated with the second set of mobile devices. However, situations might change and it might be determined that a mobile device now should use the group common PDCCH. In this situation, the mobile device can be reassigned to the first set of mobile devices. For example, a battery power level (or battery charge remaining) might be at a threshold level and, therefore, the mobile device should no longer perform blind decoding in order to converse battery power. In another example, the mobile device might be located at a cell edge and, therefore, it would be more efficient to conserve resources in order to communicate at the cell edge.

According to an implementation, the communications component 402 can receive respective indications from one or more mobile devices (e.g., the first mobile device 502, the second mobile device 504, and/or the third mobile device 506). For example, one or more of the mobile devices can provide respective implicit indications, explicit indications, or combinations thereof. In an additional or alternative implementation, the autonomous agent component 404 can autonomously determine whether one or more mobile devices decode the group common PDCCH.

In an example, the first mobile device 502 might utilize the group common PDCCH and the second mobile device 504 and the third mobile device 506 might not utilize the group common PDCCH. Thus, the first mobile device 502 can be included with the mobile devices associated, by the identification assignment component 106, with a group identifier. The transmission manager component 108 can send the group common PDCCH to the group identifier and, therefore, the group common PDCCH can be received by the first mobile device 502.

Further to this example, the network device 102 can include a notification component 508 that can inform the second mobile device 504 and the third mobile device 506 that that the group common PDCCH is not intend for those devices. In an example, a second group identifier can be created that includes the second mobile device 504, the third mobile device 506, and other mobile devices that do not need the group common PDCCH to communicate within the wireless network. By providing the notification, the second mobile device 504 and the third mobile device 506 can conserve resources (e.g., processing capability, battery power, and so on).

According to some implementations, a device that previously did not utilize the group common PDCCH might change and, thereafter might utilize the group common PDCCH. For example, the third mobile device 506 might move to a cell edge and, therefore, consumes more power. Thus, to save battery life, the third mobile device 506 might want to discontinue the blind decoding (e.g., blind PDCCH/PDSCH detection). Accordingly, the third mobile device 506 can inform the network device 102 to include the third device in the unique identifier group and/or the network device 102 (e.g., through the autonomous agent component 404) can make the determination.

In an alternative implementation, the first mobile device 502 might no longer utilize the group common PDCCH. For example, the first mobile device 502 might have left the network area or might have moved away from a cell edge. Thus, there might be no devices within the network that utilize the group common PDCCH. Thus, the network device can deactivate transmission of the group common PDCCH, which can conserve resources. The transmission can be activated based on a determination that one or more mobile devices utilize the group common PDCCH.

According to some implementations, the network device 102 can include a machine learning component 510 that can perform a set of machine learning computations associated with group common downlink control channel management. For example, the machine learning component 510 can perform a set of machine learning computations associated with the device determinations and device groupings in a wireless communications network.

Figure 6:
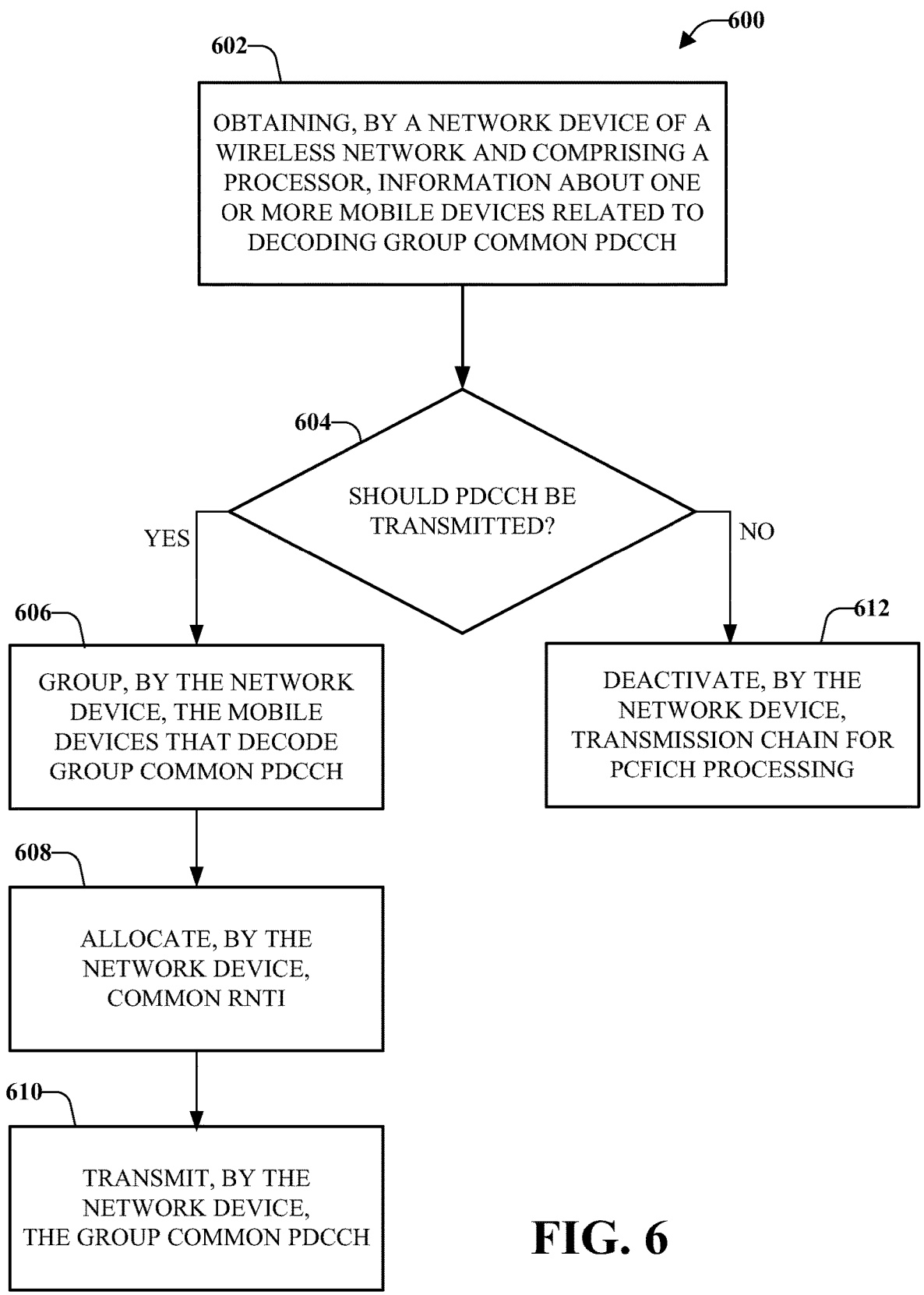
FIG. 6 illustrates a high-level example, non-limiting method for management of transmissions in accordance with one or more embodiments described herein.

The machine learning component 510 can utilize machine learning systems that have been explicitly or implicitly trained to learn, determine or infer device properties, whether a group common PDCCH should be transmitted to a device, and so on. It is to be appreciated that machine learning systems can be implemented in one or more of the components to manage group common downlink control channels to conserve resources, increase processing efficiencies, conserve battery power, and so on FIG. 6 illustrates a high-level example, non-limiting method 600 for management of transmissions in accordance with one or more embodiments described herein. The non-limiting method 600 starts at 602 when information about one or more mobile devices is obtained. The information can include whether a mobile device is employing data contained in a group common PDCCH or does not utilize the group common PDCCH. For example, the determination can be made based on whether the mobile device is decoding the group common PDCCH.

According to an implementation, the information can be obtained based on an explicit indication from the mobile device. For example, the mobile device can explicitly indicate whether the mobile device requires group common PDCCH or not by indicating one bit. The one bit can be provided as part of an RRC message that the mobile device sends to the network.

According to another implementation, the information can be obtained based on an implicit indication from the mobile device. For example, the mobile device can provide the information as part of the mobile device capability. According to an aspect, the mobile device capability can be provided in an RRC message. In an example, the mobile device can provide a category type that indicates the category to which the mobile device belongs. For example, if the mobile device is a category 1, then the mobile device needs group common PDCCH from the network. If the mobile device is a category 2, then the mobile device does not need group common PDCCH. Therefore, this information can be communicated implicitly.

In some implementations, the information can be obtained based on an autonomous network determination. For example, the network (e.g., the network device) can determine autonomously whether the mobile device is able to decode PDCCH/PDSCH without use of group common PDSCH. Further to this example, the network can turn off the group common PDCCH and request all the mobile devices to transmit the SRS and/or send aperiodic CSI report. This request can be transmitted one or more times (e.g., 10 or more). The network can determine that mobile devices from which a CSI report and/or the SRS are not received are mobile devices that are not able to decode the PDCCH without assistance from group common PDCCH. This can assist the network device to determine group common PDCCH for the mobile device.

At 604 a determination is made whether the group PDCCH should be transmitted based on the information obtained at 602. If the group PDCCH should be transmitted ("YES"), at 606, the mobile device is grouped with other mobile devices that need the group PDCCH. At 608, a group common RNTI (e.g., a common mobile device identifier) can be allocated to those mobile devices. At 610, the group PDCCH can be communicated to the group of mobile devices based on the group common RNTI. According to an implementation, RRC signaling can be utilized.

According to some implementations, the network can indicate to the mobile devices that do not require group common PDCCHs that the network is not transmitting group common PDCCH. This indication can be transmitted by an explicit indication or by impact indication of resetting common RNTI.

If the determination at 604 is that the group common PDCCH should not be transmitted ("NO"), at 612, the network device can deactivate the transmission chain for PCFICH processing. The deactivation can conserve resources at the network device.

Figure 7:
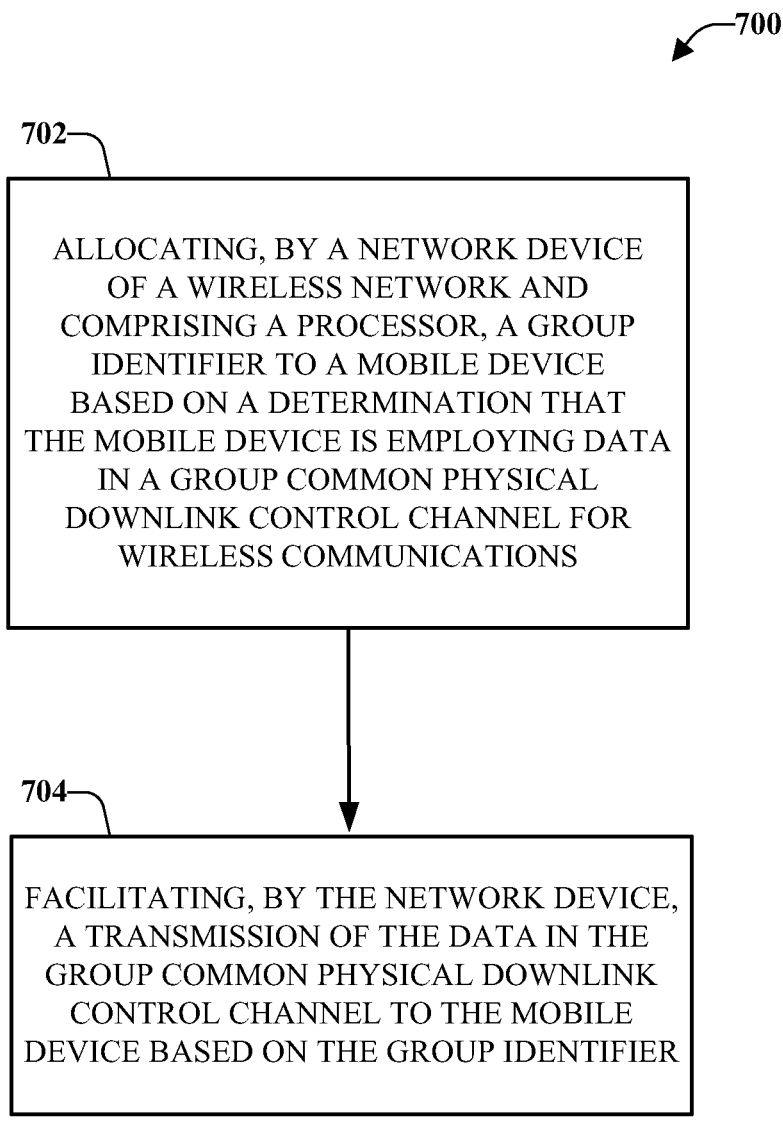
FIG. 7 illustrates an example, non-limiting method for management of group common downlink control channels in accordance with one or more embodiments described herein.

FIG. 7 illustrates an example, non-limiting method 700 for management of group common downlink control channels in accordance with one or more embodiments described herein. At 702, a network device of a wireless network and comprising a processor can allocate a group identifier to a mobile device based on a determination that the mobile device uses a group common physical downlink control channel for wireless communications. The group identifier can be a radio network temporary identifier, according to an implementation.

In an example, the determination can be made based on implicit information received from the mobile device. In another example, the determination can be made based on explicit information received from the mobile device. In a further example, the determination can be made autonomously at the network device.

At 704, the network device can facilitate a transmission of the group common physical downlink control channel to the mobile device based on the group identifier. For example, the one or more mobile devices included in the group identifier can receive the group common physical downlink control channel. The transmission can be facilitated utilizing radio resource control signaling. According to some implementations, the group common physical downlink control channel comprises a group common physical downlink control channel configured to operate according to a fifth generation wireless communication network protocol.

Figure 8:
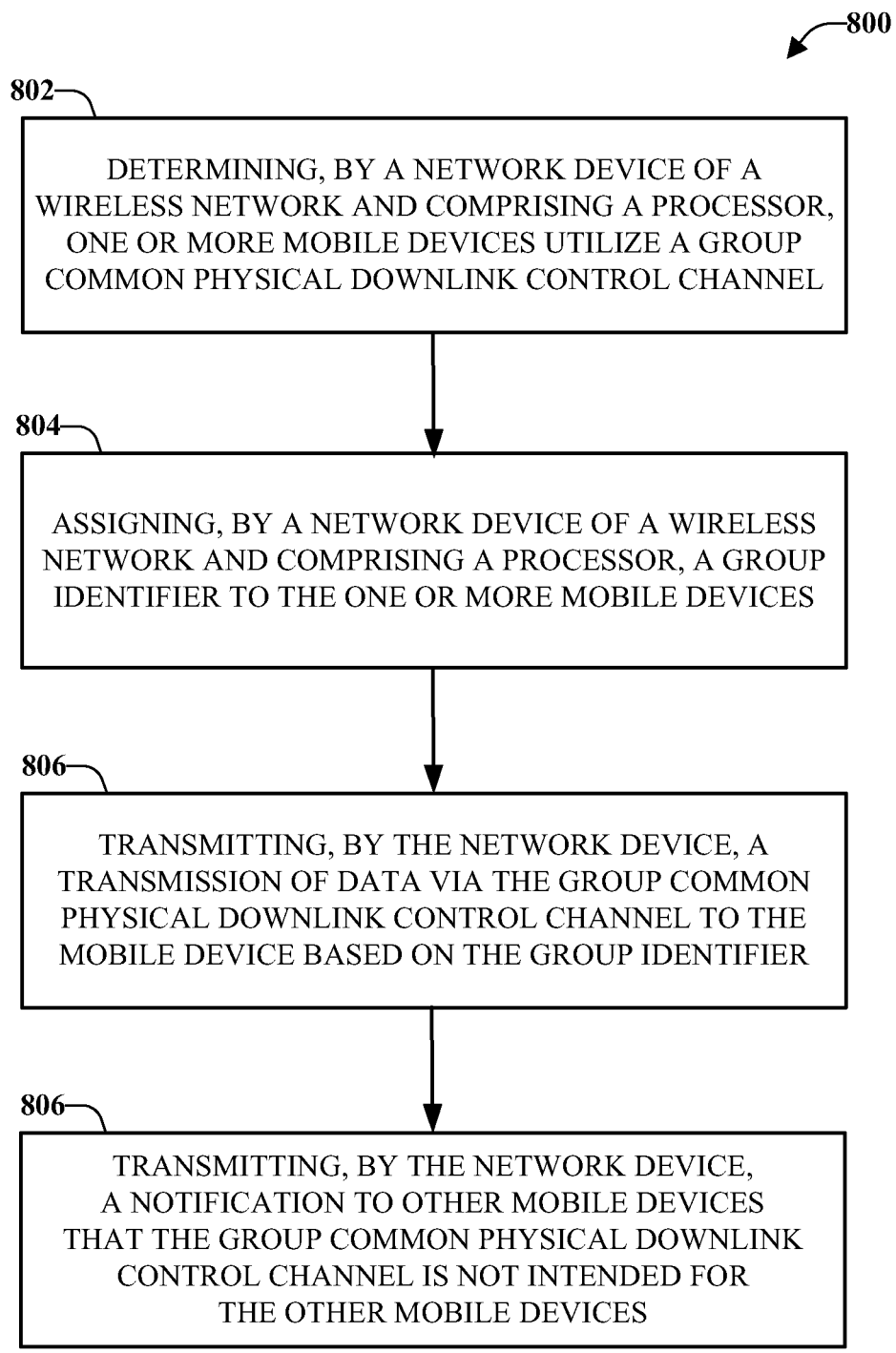
FIG. 8 illustrates an example, non-limiting method for selectively transmitting group common downlink control channels in accordance with one or more embodiments described herein.

FIG. 8 illustrates an example, non-limiting method 800 for selectively transmitting group common downlink control channels in accordance with one or more embodiments described herein. At 802, a network device comprising a processor determines one or more mobile devices within a wireless network utilize a group common PDCCH. The determination can be made based on information received (explicitly or implicitly) by the mobile devices and/or based on an autonomous determination by the network device.

For example, the network device can receive an explicit indication from the mobile device. The explicit indication can comprise one data bit that indicates that the mobile device uses the group common physical downlink control channel. Further to this example, receiving the explicit indication comprising the one data bit can comprise receiving a radio resource control message from the mobile device.

In another example, the network device can receive an implicit indication from the mobile device. The implicit indication can comprise data related to a category of device to which the mobile device belongs. A first category can indicate the mobile device uses the group common physical downlink control channel A second category can indicate the mobile device does not use the group common physical downlink control channel.

In a further example, the network device can autonomously determine that the mobile device uses the group common physical downlink control channel. To make the determination, the network device can send a request for the mobile device to provide a report to the network device. The network can determine that the mobile device uses the group common physical downlink control channel based on the report being determined not to have been received from the mobile device within a threshold number of requests for the report. According to an implementation, the report can be an aperiodic channel status indication report. In accordance with another implementation, the report can be a sounding reference signal measurement.

At 804, the network device can assign a group identifier to the one or more mobile devices that utilize the group common PDCCH. Further, the network device can transmit the group common PDCCH to the one or more mobile devices based on the group identifier.

For other mobile devices that do not utilize the group common PDCCH, at 806, the network device can transmit a notification indication to the other mobile devices that the group common PDCCH is not intended for the other mobile devices.

Described herein are systems, methods, articles of manufacture, and other embodiments or implementations that can facilitate management of group common downlink control channels in a 5G network. Facilitating of group common downlink control channels a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
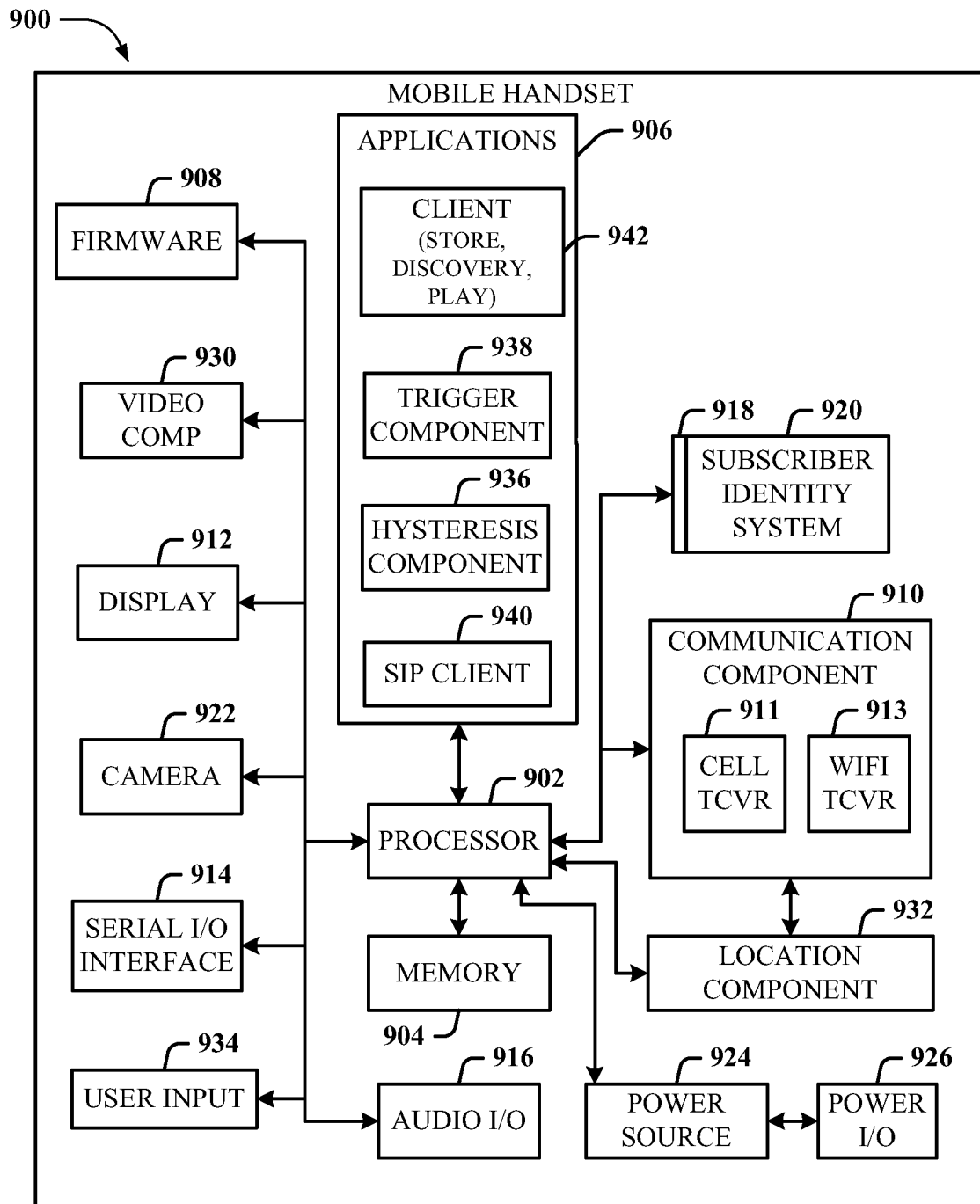
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 1010 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
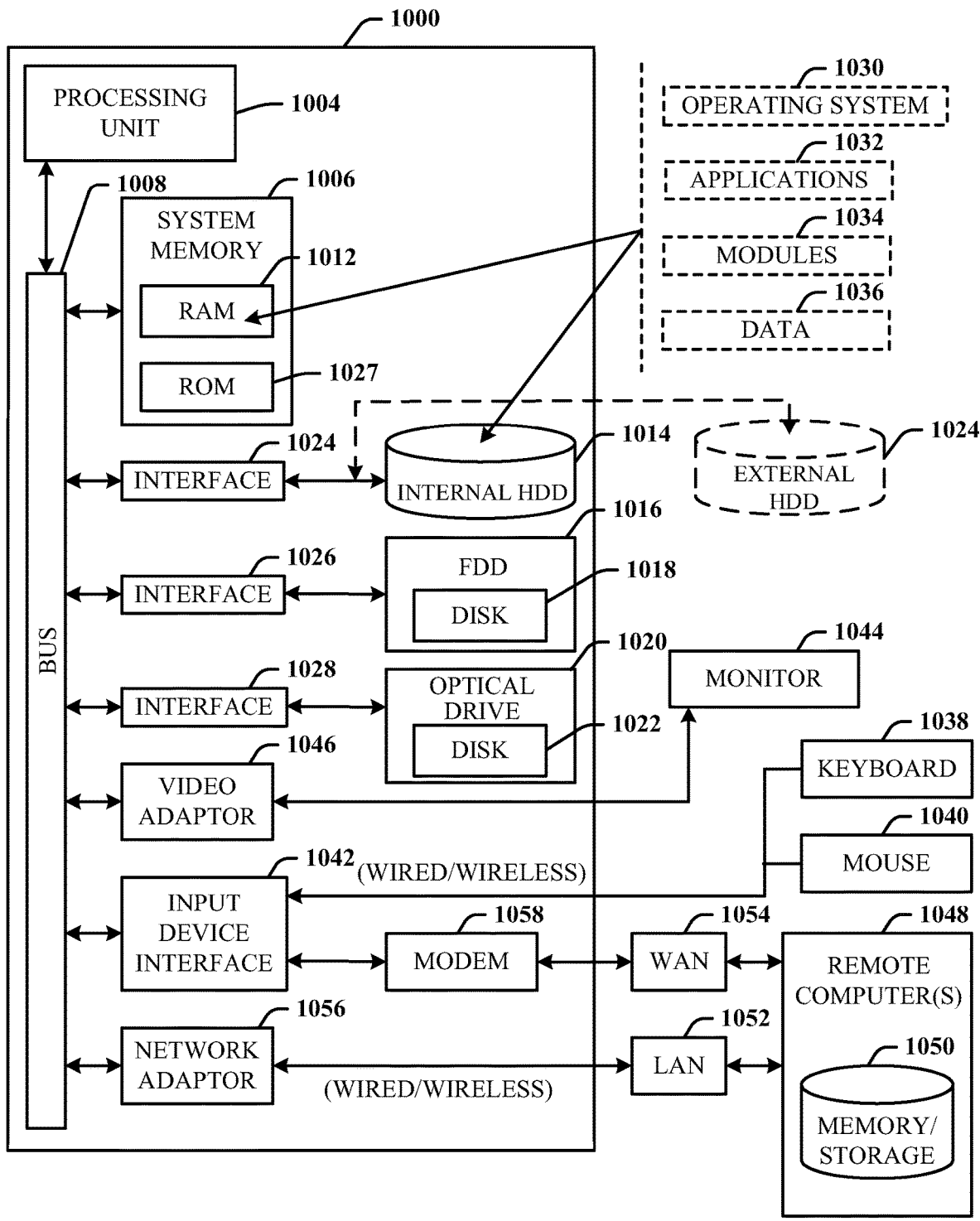
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprisewide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows. Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A method, comprising:
based on a first determination that a first user equipment, which employs data sent via a group common physical downlink control channel, is in communication with network equipment, sending, by the network equipment, a transmission via the group common physical downlink control channel, wherein the network equipment comprises a processor;
based on a second determination that the first user equipment is no longer in communication with the network equipment, discontinuing the transmission via the group common physical downlink control channel; and
based on a third determination that a second user equipment, which employs the data sent via the group common physical downlink control channel, is in communication with the network equipment, resuming the transmission via the group common physical downlink control channel.

2. The method of claim 1, further comprising:
based on a fourth determination that the second user equipment is no longer in communication with the network equipment, and that the first user equipment continues to be no longer in communication with the network equipment, discontinuing, by the network equipment, the transmission via the group common physical downlink control channel.

3. The method of claim 1, further comprising:
prior to the resuming, receiving, by the network equipment, an implicit indication that the data sent via the group common physical downlink control channel is utilized by the second user equipment, wherein the implicit indication comprises a single data bit.

4. The method of claim 1, wherein the determining comprises:
prior to the resuming, receiving, by the network equipment, an implicit indication that the data sent via the group common physical downlink control channel is utilized by the second user equipment, wherein the implicit indication comprises a device category that indicates the second user equipment utilizes the group common physical downlink control channel.

5. The method of claim 1, further comprising:
prior to the discontinuing, determining, by the network equipment, that the second user equipment, in communication with the network equipment, does not employ the data sent via the group common physical downlink control channel for communication.

6. The method of claim 5, wherein the determining comprises:
disabling, by the network equipment, the transmission of the group common physical downlink control channel;
sending, by the network equipment, a request for the second user equipment to reply with a channel state information report, wherein the sending is via a channel other than the group common physical downlink control channel; and
receiving, by the network equipment, the channel state information report from the second user equipment during the disabling.

7. The method of claim 5, wherein the determining comprises:
disabling, by the network equipment, the transmission of the group common physical downlink control channel;
sending, by the network equipment, a request for the second user equipment to reply with a sounding reference signal, wherein the sending is via a channel other than the group common physical downlink control channel; and
receiving, by the network equipment, the sounding reference signal from the second user equipment during the disabling.

8. The method of claim 5, wherein the determining comprises:
receiving, by the network equipment, an implicit indication that the data sent via the group common physical downlink control channel is not utilized by the second user equipment, wherein the implicit indication comprises a single data bit.

9. The method of claim 5, wherein the determining comprises:
receiving, by the network equipment, an implicit indication that the data sent via the group common physical downlink control channel is not utilized by the second user equipment, wherein the implicit indication comprises a device category that indicates the second user equipment does not utilize the data sent via the group common physical downlink control channel.

10. A system, comprising:
a processor; and
a memory that stores executable instructions that, when executed by the processor, facilitate performance of operations, comprising:
based on a first determination that a first user equipment utilizes data contained in a group common physical downlink control channel for communication with network equipment, sending a transmission to the first user equipment via the group common physical downlink control channel; and
based on a second determination that the first user equipment is no longer in communication with the network equipment and a third determination that a second user equipment that is in communication with the network equipment does not utilize the data contained in the group common physical downlink control channel for communication, stopping the transmission via the group common physical downlink control channel.

11. The system of claim 10, wherein the operations further comprise:
prior to the sending, disabling, by the network equipment, the transmission of the group common physical downlink control channel;
transmitting, by the network equipment, a request for the first user equipment and the second user equipment to reply with respective channel state information reports, wherein the transmitting is via a channel other than the group common physical downlink control channel; and
receiving, by the network equipment, a first channel state information report from the second user equipment during the disabling, wherein a second channel state information report is not received from the first user equipment during the disabling.

12. The system of claim 10, wherein the determining comprises:
disabling, by the network equipment, the transmission of the group common physical downlink control channel;
sending, by the network equipment, a request for the second user equipment to reply with a sounding reference signal, wherein the sending is via a channel different from the group common physical downlink control channel; and
receiving, by the network equipment, the sounding reference signal from the second user equipment during the disabling.

13. The system of claim 10, further comprising:
based on a fourth determination that a third user equipment, which employs the data contained in the group common physical downlink control channel, is in communication with the network equipment, resuming the sending the transmission via the group common physical downlink control channel.

14. The system of claim 10, wherein the operations further comprise:
prior to the sending, receiving, from the first user equipment, a radio resource control message that comprises an explicit indication that the first user equipment utilizes the data contained in the group common physical downlink control channel.

15. The system of claim 10, wherein the operations further comprise conserving resources at the network equipment based on the stopping.

16. The system of claim 10, wherein the first user equipment and the second user equipment are user equipment configured to operate according to a fifth generation communication protocol.

17. A non-transitory machine-readable medium, comprising executable instructions that, when executed by a processor, facilitate performance of operations, comprising:
based on a first determination that a first user equipment employs data sent via a group common physical downlink control channel and that a second user equipment does not employ the data, transmitting data via the group common physical downlink control channel, wherein the first user equipment and the second user equipment are in communication with network equipment;
based on a second determination that the first user equipment is no longer in communication with the network equipment, discontinuing the transmitting of the data via the group common physical downlink control channel; and
based on a third determination that the first user equipment has resumed communication with the network equipment, resuming a transmission of the data via the group common physical downlink control channel.

18. The non-transitory machine-readable medium of claim 17, wherein the operations further comprise:
based on a fourth determination that a third user equipment, which employs the data, is in communication with the network equipment, resuming the transmission of the data via the group common physical downlink control channel.

19. The non-transitory machine-readable medium of claim 17, wherein the operations further comprise:
prior to the transmitting, disabling the transmission of the group common physical downlink control channel;
sending a request for the second user equipment to reply with a channel state information report, wherein the sending is via a channel other than the group common physical downlink control channel; and
receiving the channel state information report from the second user equipment during the disabling.

20. The non-transitory machine-readable medium of claim 17, wherein the operations further comprise:
prior to the transmitting, disabling the transmission of the group common physical downlink control channel;
sending a request for the second user equipment to reply with a sounding reference signal, wherein the sending is via a channel other than the group common physical downlink control channel; and
receiving the sounding reference signal from the second user equipment during the disabling.

* * * * *